United States Patent
Di Guardo et al.

[11] Patent Number: 5,914,984
[45] Date of Patent: Jun. 22, 1999

[54] METHOD AND DEVICE FOR PULSE WIDTH MODULATION CONTROL

[75] Inventors: Mario Di Guardo, Cantania; Giuseppe D'Angelo; Matteo Lo Presti, both of Misterbianco, all of Italy

[73] Assignee: SGS-Thomas Microelectronics S. r. l., Agrate Brianaza, Italy

[21] Appl. No.: 08/898,621

[22] Filed: Jul. 22, 1997

[30] Foreign Application Priority Data

Jul. 24, 1996 [EP] European Pat. Off. .............. 96830410

[51] Int. Cl.$^6$ ...................................................... H03K 7/08
[52] U.S. Cl. .......................................... 375/238; 332/109
[58] Field of Search ............................. 375/238; 370/205, 370/212; 332/109, 106, 110, 107; 320/145; 318/599

[56] References Cited

U.S. PATENT DOCUMENTS

| | | | |
|---|---|---|---|
| 4,466,070 | 8/1984 | Claussen .................................. | 702/198 |
| 5,119,045 | 6/1992 | Sato ......................................... | 332/109 |
| 5,231,363 | 7/1993 | Sano et al. ............................... | 332/109 |
| 5,311,548 | 5/1994 | Nikolaus ................................. | 375/238 |
| 5,519,361 | 5/1996 | Kim ......................................... | 332/109 |
| 5,737,366 | 4/1998 | Gehlot ..................................... | 375/238 |

FOREIGN PATENT DOCUMENTS

| | | | |
|---|---|---|---|
| 2 606 231 | 5/1988 | France .............................. | H03L 7/00 |
| 36 32 232 | 4/1988 | Germany ......................... | H03K 23/00 |

Primary Examiner—Chi H. Pham
Assistant Examiner—Khai Tran
Attorney, Agent, or Firm—Allen, Dyer, Doppelt, Milbrath & Gilchrist, P.A.

[57] ABSTRACT

In a fully digital PWM controller employing a sine-triangle modulating technique, the method includes the step of linearizing the dependence of the selected scanning frequency of the memory containing the digital samples of the modulating sinusoid, from the value of the digital selection datum, and improves regulation at low speed by improving the resolution of selectable frequency values. The PWM driving signals produced by a fully digital controller implementing the linearization step of the invention show an F.F.T. extremely close to the F.F.T. of comparable PWM driving signals produced through a conventional analog technique.

10 Claims, 5 Drawing Sheets

METHOD AND DEVICE FOR PULSE WIDTH MODULATION CONTROL

FIELD OF THE INVENTION

The present invention relates to a method and device for generating a Pulse Width Modulation (PWM) signal in a fully digital mode.

BACKGROUND OF THE INVENTION

A wide variety of electronic systems call for the capacity of producing a PWM signal, such as, in particular, in DC/AC converters, PWM inverters for driving alternating current motors, in control systems comprising phase locked loops (PLL), and similar systems.

A widely used modulating technique is the so-called sine-triangle technique. This includes comparing a first alternating signal which might be a sinusoid (customarily referred to as the modulating signal or the control signal) with a second alternating signal, essentially of a triangular shape (customarily referred to as the carrier signal or the reference signal).

In many applications, such as those cited above, variation of the frequency of the produced modulated signal takes place by varying the frequency of the control signal (for instance sinusoidal), whereas the variation of the generated voltage may be obtained by varying the amplitude of the triangular signal. In this type of system realized in a fully digital mode, the voltage and frequency variation is actuated via dedicated algorithms for the generation of digital data streams symbolizing the alternating control signals, by employing a microprocessor, often using a pre-established scheme in the form of a look-up table. In these systems, the number of values selectable or digital data are intrinsically limited in terms of available memory space. Furthermore, the control chain includes one or more microprocessors whose cost may have a substantial impact on the overall cost of these products.

Moreover, in recent years the development of DC/AC converters has made possible extending the use of the asynchronous motor in many industrial sectors. Prior to the evolution of converters, and when such energy conversion was not readily attainable, the motor could be rigorously used in line with nominal specifications (frequency and voltage) as defined by the manufacturer. Indeed, to vary speed and torque it is indispensable, to vary both the supply voltage and the frequency. Such a motor could be controlled only by the use of dynamic converters or costly mechanical transmission systems. Nowadays this machine is attracting a renewed interest because of its intrinsic simplicity and sturdiness that make it preferable to DC machines, in part, due to cost-effective new electronic technologies capable of providing reliable and compact switching devices.

To generate proper driving signals of variable voltage and frequency for an asynchronous motor modulation techniques are necessary, such as the sine-triangle PWM technique.

Obviously, for a proposed application as the above mentioned of driving a multiphase, typically a three-phase, AC motor, it is necessary to generate three sinusoidal control signals. The control signals are out of phase by 120° among each other, and the frequency and amplitude are regulated by the control system.

Generally, one of the technical problems that is encountered in realizing these systems in a digital form, using a static memory for storing a sequence of a number (m) of digital samples of a sinusoid, each of which is stored in the form of a word composed of a certain number of bits, is due to the way an appropriate scanning frequency of the control sinusoid is established as a function of the frequency of the PWM to be produced. In a digital control system the approach is that of selecting the scanning frequency using a selection word or datum N, producing then the desired scanning frequency thus selected by a block that divides a basic scanning clock frequency by the selection datum N, incremented by one (to avoid an illicit division by zero).

As indicated in FIG. 1, this relationship follows an hyperbolic characteristic. This implies that the resolution becomes more and more difficult for small values of N and this the regulation may become critical. The characteristic depicted in FIG. 1 shows indeed accentuated discontinuities for small values of N. For instance, when setting rather high speeds (corresponding, for example, to a drive frequency of 50 Hz or higher), on the basis of possible binary resolutions in this range (0–25), it becomes difficult to correctly set the desired memory scanning frequency.

Evidently, there exists the need and/or usefulness for an improved method of generating digital streams representing modulated PWM signals that can be implemented using relatively simplified logic circuitry interfaceable to any power driving circuit for a digital DC/AC conversion, and capable of handling the control signals for the power switching devices.

SUMMARY OF THE INVENTION

Basically, the method of the invention comprises a step of pre-dividing the frequency of a basic memory scanning clock signal by a divider n, incremented by one, pointed from a look-up table by the digital selection command N, wherein the pre-computed and stored digital values of the divider n correspond to the values of a function of N, to thereby linearize the dependence of the scanning frequency from the value of N.

By taking into account that the sequence of digital samples into which is subdivided the alternating control signal, typically the control sinusoid may include for example a number m of samples, the frequency of the basic memory scanning clock signal may be given by the product of a system clock frequency Clk by the number m of digital samples into which is subdivided the sinusoid to be scanned. Of course, the memory may also contain a number, multiple of m, of digital samples of the sinusoid and therefore be able to support different scanning modes; as for example, from a relatively coarse mode where the number m of scanned samples be relatively small, e.g. 24, to a high resolution scanning mode involving the scanning of for example 92 samples. Thus, the ripple of an analog signal output by a DC/AC converter is greatly reduced.

Furthermore, in the event of multiphase systems, a first alternative would be that of storing in the memory a plurality of outphased sequences of the same digital samples to permit reading of the instantaneous sample of each sinusoid, by addressing the memory in a parallel mode. Alternatively, just one sequence of digital samples may be stored in the memory and a reconstruction during a plurality of digital streams representing as many out-of-phase sinusoidal signals, may be performed during the reading phase by reading and storing the instantaneous sample relative to the different sinusoids in as many registers, at different instants, through a pre-defined sequential addressing. The required phase shift among the different sinusoids being stored in the respective registers are thus obtained.

Of course, in the first case, the memory requirement will be greater whereas in the second case there is the need of reading the data in the memory with a scanning frequency multiple of the selected real scanning frequency by a factor that matches the number of phases. Finally, instances may be postulated whereby the control signal is not a pure sinusoid, but any other alternating wave having a purposely pre-defined shape.

BRIEF DESCRIPTION OF THE DRAWINGS

The different aspects and advantages of the invention will become even more evident through the following description of some important embodiments and by referring to the attached drawings, wherein.

DETAILED DESCRIPTION OF THE PREFERRED EMBODIMENTS

The ensuing description and the attached drawings have a purely illustrative purpose. The invention is not to be perceived as limited to the described embodiments or intended as applicable only to a control system of a PWM inverter for driving a three-phase motor.

Figure 1:
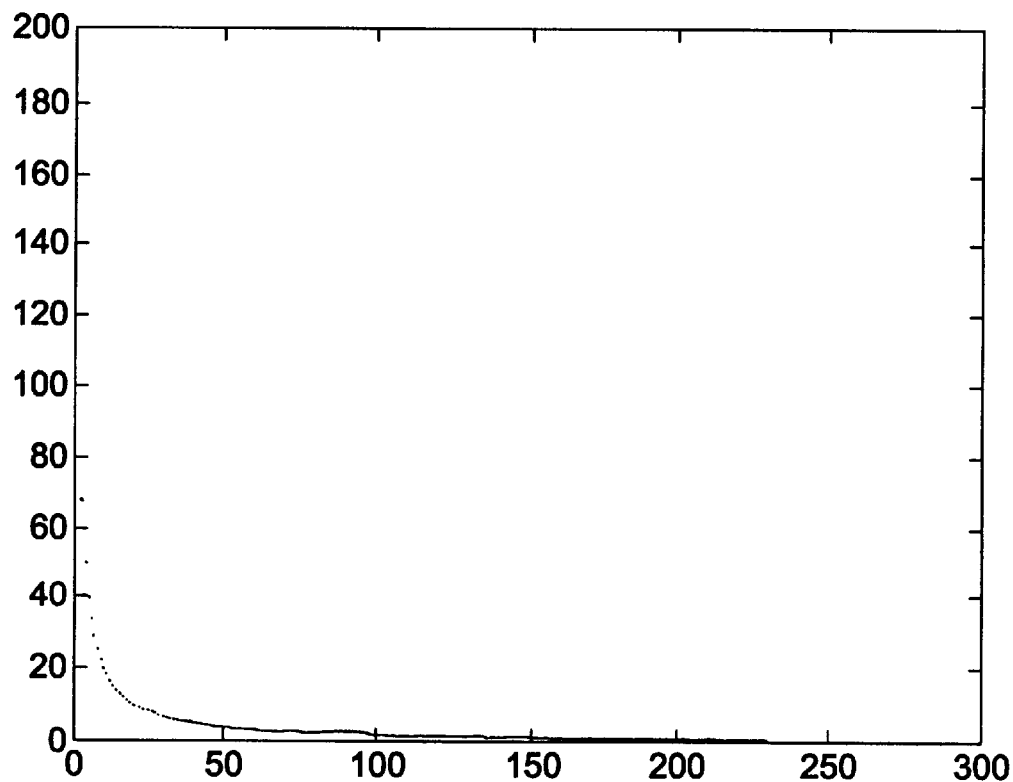
FIG. 1 shows the hyperbolic relationship between a digital selection value N and the selected scanning frequency, according to a common technique as previously described.
Figure 2:
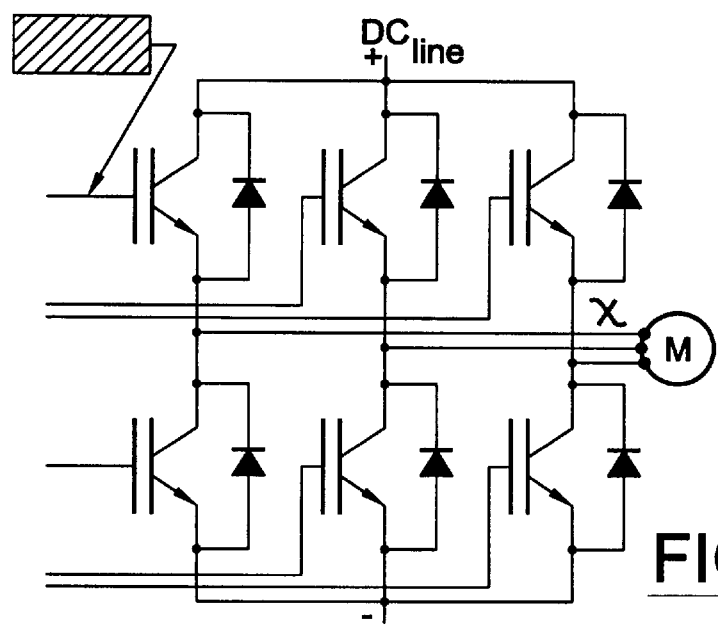
FIG. 2 shows a classical scheme of a three-phase power stage using six power switches, driving the phase windings of a tri-phase AC motor.
Figure 3:
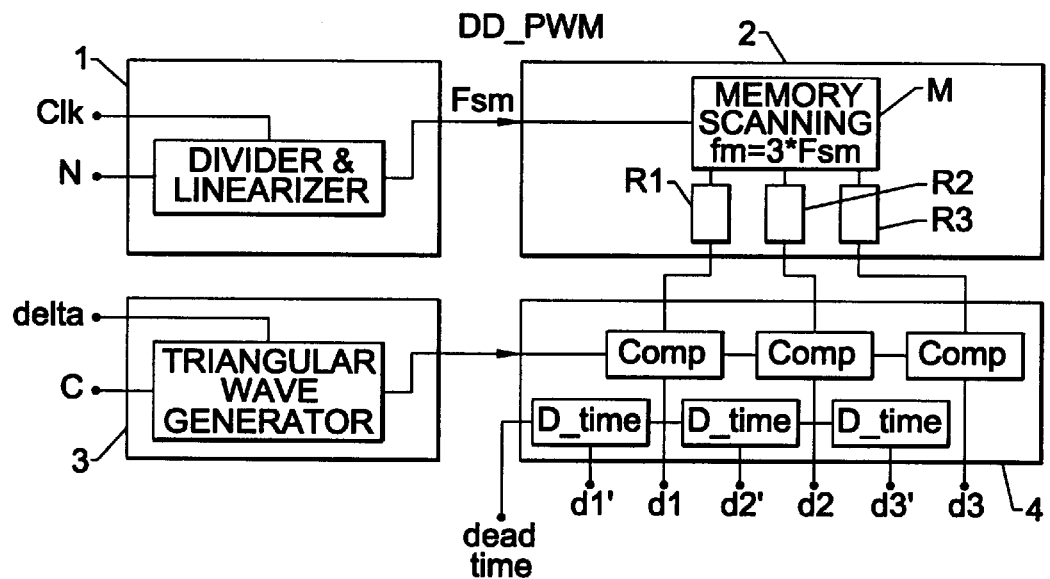
FIG. 3 is a high level block diagram of a digital PWM driving system, realized according to the present invention.

FIG. 2 shows the classical scheme of a power stage for driving a three-phase motor M. The stage comprises six power switches, which, in the example shown, may be IGBT or MOSFET devices. FIG. 3 shows a high level functional scheme of a control and driving system for a three-phase power stage as that depicted in FIG. 2.

According to a digital implementation of the control system, this may comprise a driving block 4 which, for the assumed case, would include three comparators, namely: COMP1, COMP2 and COMP3, to an input of which is fed the same stream of digital data representing a triangular alternating signal, generated by the block 3. Through second inputs of the three comparators are respectively fed streams of digital data representing three distinct control sinusoidal signals, separated in phase by 120°.

PWM signals are generated at the outputs of the three comparators. These signals may directly drive the sourcing power switches of the stage shown in FIG. 2 and after introduction of a certain delay dead time by the respective T_time blocks, also the three sinking switches.

The block 2 represents in a generic way a circuit that generates the control sinusoids in digital form separated in phase by 120°, to be supplied to the inputs of the comparators COMP1, COMP2 and COMP3 respectively. The scheme of block 2 in FIG. 3 is relative to the alternative embodiment according to which a unique sequence of digital samples of a sinusoid is stored in a nonvolatile memory M.

The reconstruction of three distinct streams of digital data, representing three sinusoidal signals separated in phase by 120°, is performed by reading and storing the instantaneous data relative to the three sinusoids to be generated, at different instants, in three different registers R1, R2 and R3. This is done using a pre-established address scheme, leading to a 120° shift. Of course, the scanning frequency used for reading the instantaneous data for the three sinusoids from the memory M must be at least three times higher than that of the output streams.

The block 3 generates a stream of digital data representing a reference alternating signal of triangular shape that is fed in common to first inputs of the comparators COMP1, COMP2 and COMP3. Substantially, block 3 may contain an up-down counter of an appropriate modulo, for instance of modulo 1024. Through the delta input of block 3, the user may choose a factor as a coefficient of multiplication, for example, a value lower than 1, to adjust the period of the triangular alternating signal.

Through the input C of the block may be supplied a clock signal of a frequency that can be pre-established by the user depending on the switching frequency of the power devices required by the system. Usually this pre-arranging of the clock frequency may be implemented by a pre-scaling clock multiplier stage, capable of receiving as an input a three bit digital command that uses as a basic frequency the frequency of a general system's clock. The multiplying of the digital samples of the triangular reference signal by a certain coefficient delta ($\delta$) serves to diminish the amplitude of the triangular signal. It also simultaneously produces a level shift so that the triangular signal remains symmetric in respect to the control sinusoids, according to the expression $\delta = Ac/Am$, where Ac and Am are the amplitudes of the sinusoid and of the triangular signals respectively.

Figure 4:
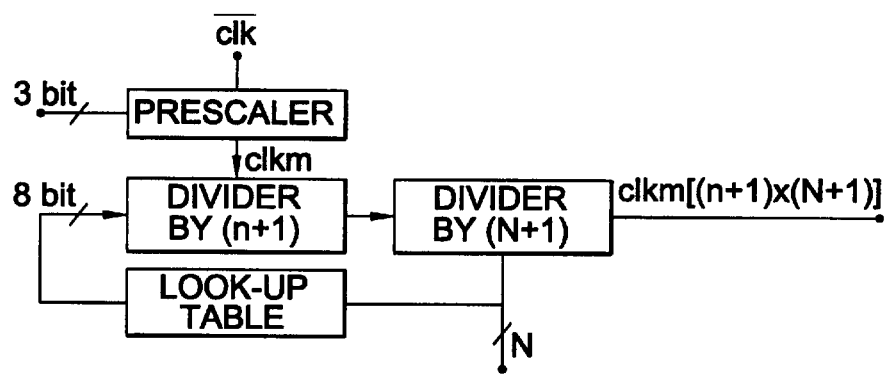
FIG. 4 shows a functional diagram of the block that generates the scanning frequency.

The block 1 includes those parts of the system that particularly realize the invention. The function of the block 1 is that of generating a scanning frequency fsm of the memory M as a function of a datum or digital selection command N. The block 1 may be realized according to the scheme depicted in FIG. 4.

Besides including a (Prescaler) multiplier stage and a divider stage by (N+1) (Divider), the block comprises an additional divider by (n+1), upstream of the divider by (N+1) and a look-up table for pre-computed values of n that are pointed by the same digital selection datum of N, which represents the divisor of the relative divider by (N+1). The pre-scaling ratio, that is to say the factor of multiplication of a general clock frequency Clk as a function of the number m of digital samples into which is subdivided the sinusoid stored in the memory M, may be pre-set by means of a three bit command. Hence, the output of the Prescaler is a basic scanning clock signal Clkm of the memory M.

For instance, upon assuming that a control sinusoid be stored in a nonvolatile memory of 48 words of 8 bits (48 byte), the basic scanning clock frequency Clkm, produced by the pre-scaling block and equivalent to Clk*48, is divided by means of two 8-bit dividers in cascade, that is, firstly by a linearization divider (n+1) and subsequently by a selection divider (N+1). Therefore:

$$fsm = \frac{Clkm}{(N+1)(n+1)}$$

The linearization factor n is pre-calculated according to the following equation:

$$n = \frac{Clkm}{fsm} * \frac{1}{(N+1)} - 1$$

$$n \in [1; 255]$$

and the 8 bit values, thus pre-computed and included in the field 0<n<256, are stored in a dedicated register or look-up table.

Figure 5:
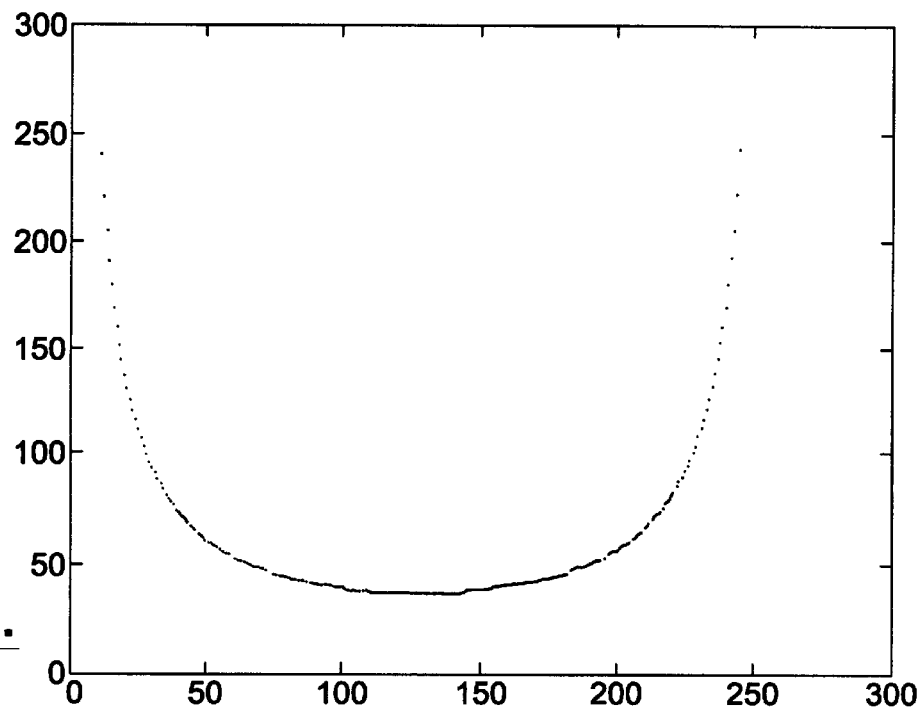
FIG. 5 shows the relationship between the parameters n and N.

The 8 bit values pre-computed and stored in the look-up table are addressed (pointed) by the same digital value of selection N, also of 8 bits, which also constitutes the divisor of the second divider by (N+1). The plot of FIG. 5 shows the linearization law of the above relationship.

Figure 6:
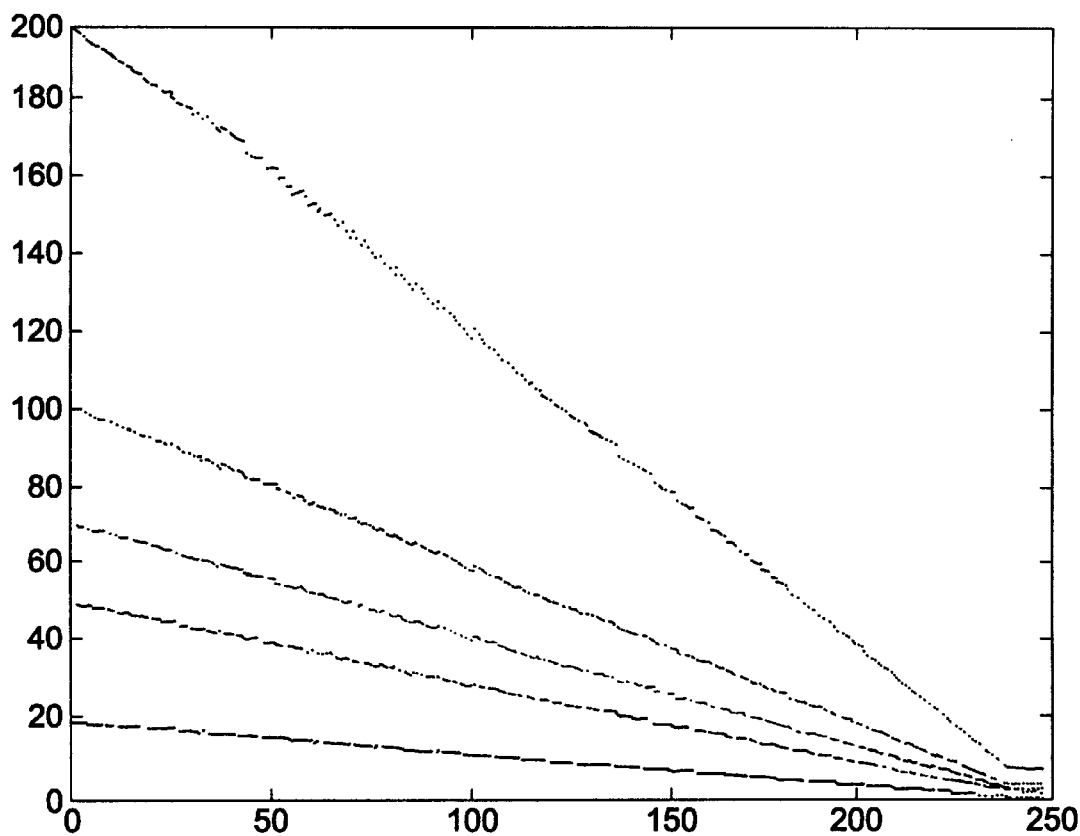
FIG. 6 shows pre-scaling characteristics of the frequency of the basic memory scanning clock.

FIG. 6 shows a family of straight lines passing through a fixed point and whose angular coefficient is proportional to the value of the basic memory scanning clock frequency (Clkm) that represents the Prescaler function. The gradient of the straight line may be varied by the user depending upon the operating zone in which the motor is to function.

In the considered application of driving a tri-phase AC motor, the digital control system of the driving according to the present invention allows a microprocessor, eventually used in the control chain, to rapidly perform a correct calculation of the slip. Indeed the estimated slip s would be given by the difference between the speed of the stator rotating field ws and the speed of the rotor wr:

$$s = \frac{ws - wr}{ws} = \frac{fs - fr}{fs}$$

In the majority of cases, when operating in a fully digital mode, these values would be expressed in 8 bit words, that is, they would be numbers between 0 and 255.

Ideally the slip should be null under no-load, as well as under full-load conditions. In reality, it is not null (s≠0) when the system is under a load. Therefore, it is important and desirable to keep the slip as close as possible to zero. This means that the value fs that assigns the stator's frequency be very close to the value fr fed to the microprocessor by dedicated sensors or other equivalent means. If, for example, the control system uses a tachometric dynamo for monitoring the motor speed, that will provide a voltage proportional to the speed, and therefore, subsequent to A/D conversion, a corresponding digital value will be input to the microprocessor. In this case the digital value is a linear function of the voltage and of the speed.

Therefore, in a system realized in conformity with the present invention, this value may be directly utilized in the above stated slip control relationship, thanks to the linearization offered by the system of the invention. By contrast, in prior art systems the mapping required for performing a correct calculation would be rather cumbersome and time consuming for the microprocessor to carry through.

According to the embodiment of the system of the invention disclosed above, the output of the block 2 of FIG. 3 includes three digital streams of 8 bit data that represent the values of the sinusoids digitized and reciprocally separated by 120°. Of course, the input of the block is the scanning frequency fsm produced by block 1.

The storage of the sinusoid in the memory M may be obtained starting from the following expressions:

$a$=round[127×sin $(N)$+127]

$b$=round[127×sin $(N)$+2/3π)+127]

$c$=round[127×sin $(N)$−2/3π)+127]

$N \in [0,1,2, \ldots h]$ where is h the number of points by which the sinusoid is to be digitized. In the example considered, h must be a multiple of three in order to determine an exact 120° phase shift.

The memory positions containing the respective values of the three sinusoids separated by 120°, are addressed through a module h counter. Thereafter, the reconstruction of the three digital control signals is carried out by reading and storing the data relative to the three sinusoids in three different registers R1, R2 and R3, at three different instants, using a pre-defined addressing to obtain a shift of 120°. As stated above, the reconstruction of the three digital signals may be alternatively undertaken in a parallel mode by simultaneously reading three different memories of h bytes.

Figure 7:
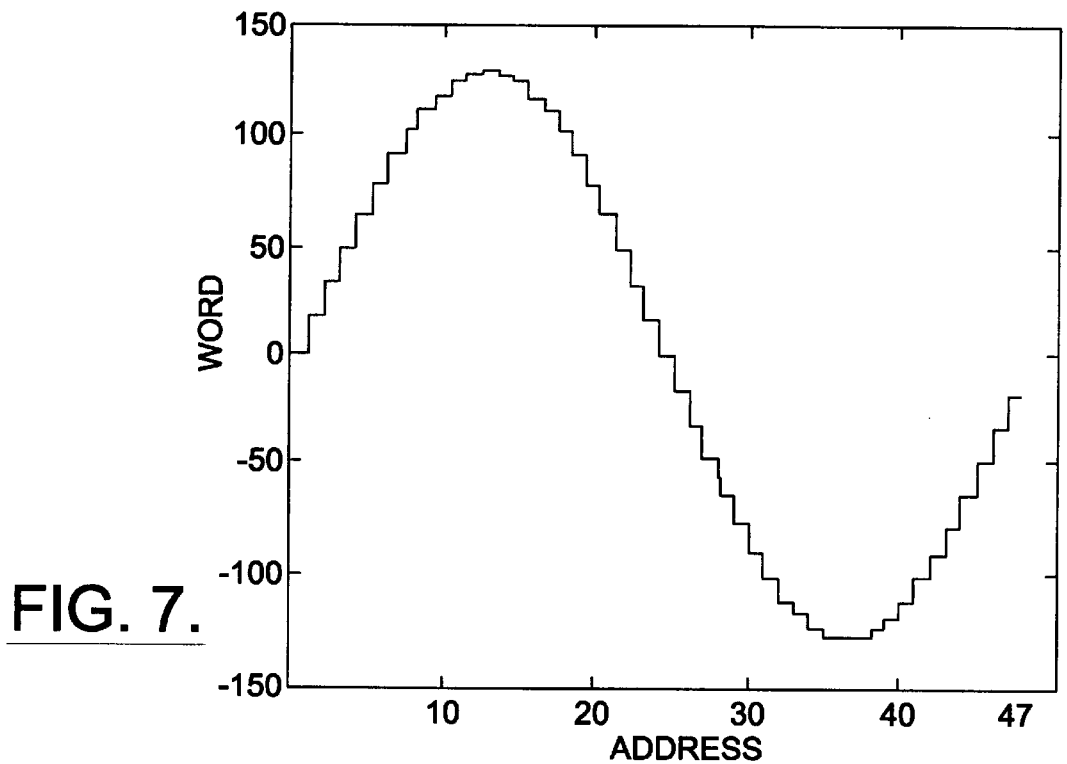
FIG. 7 shows the discretization of a sequence of 48 digital samples of a sinusoid.

FIG. 7 shows the digitization of a sinusoid with 48 points. By inserting, according to the invention, a linearization block provided by the additional stage of pre-division by (n+1), a flexible selection of the resolution is also made available. For example, if the driving is to function with a motor supply frequency range from 0 to 200 Hz, the resolution may be chosen in 200/256 corresponding to 0.78 Hz. By contrast, if the operating frequency range is from 0 to 50 Hz, the resolution may chosen to correspond to 0.19 Hz. This added flexibility is decidedly important in optimally managing the control at low speeds.

A further important advantage procured by the system of the invention is that of exactly knowing the mapping of the motor's driving frequency as a function of the control word or datum N. This is most advantageous when operating in a condition of absolute control. Moreover, the linearization that is implemented by the system of the invention simplifies the execution of the speed control algorithms.

Figure 8:
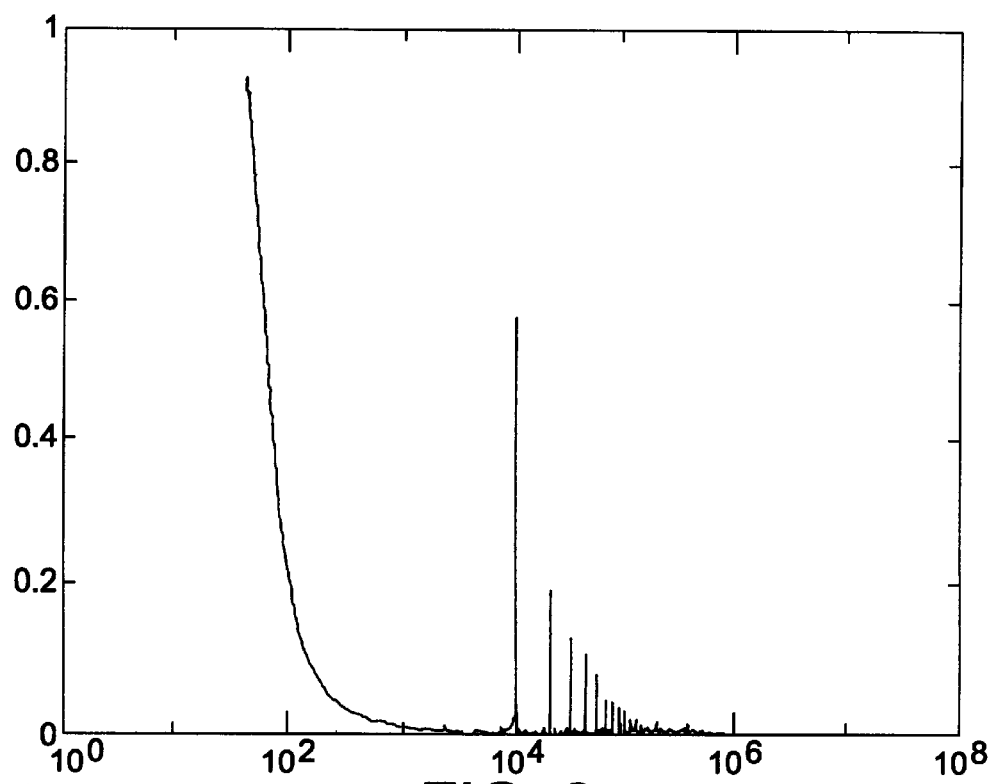
FIGS. 8 and 9 shows for comparison purposes the F.F.T. (s) of a sinusoidal signal produced by a digital DC/AC converter made according to the invention and produced by an analog DC/AC converter.

By referring again to the above described example of a practical embodiment of the invention as applied to driving of a tri-phase motor, a comparison has been made between the F.F.T. of the driving signals applied to the windings of the motor resulting from a system realized as above described, and the driving signals as generated through a conventional analog technique, starting from a switching frequency of 10 Khz. FIG. 8 shows the F.F.T. diagram starting from a 50 Hz sinusoid digitized on 48 points, obtained by the digital method of the invention, using a modulation factor δ=1, a switching frequency of 10 Khz, and a motor's supply frequency of 50 Hz.

Figure 9:
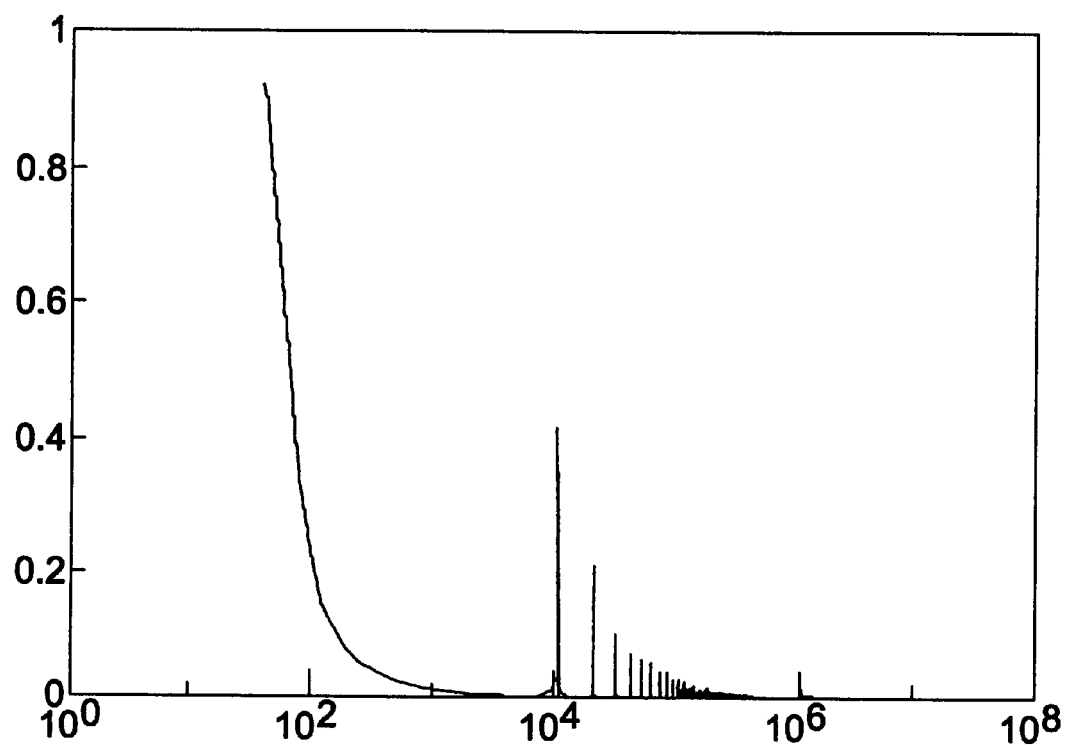

For comparison, FIG. 9 shows the F.F.T. obtained by using an analog sinusoid for modulating the PWM signal under identical operating conditions of the motor.

That which is claimed is:

1. A method of generating a first stream of digital data representing a first alternating control signal to be compared with a second generated stream of digital data representing a second triangular shaped alternating reference signal to produce a pulse width modulated signal having a frequency selectable by a digital command datum N, the method comprising the steps of:

scanning a sequence of a number m of digital values of the first alternating control signal stored in a nonvolatile manner in a form of data of a certain number of bits effected at a scanning frequency resulting from dividing a basic memory scanning clock frequency Clk multiplied by the number m of digital values into which is digitized the first alternating control signal by the digital command datum N incremented by one; and preventively dividing the basic memory scanning clock frequency Clk, pre-scaled by multiplying by the number m of digital values, by a divisor n incremented by one, chosen from a look up table of digital values using the digital command datum N to point the chosen value, and wherein the digital values of the divisor n stored in the look-up table correspond to a linearization function of the digital command datum N of the dependence of the scanning frequency fsm on the digital command datum N.

2. The method according to claim 1, wherein the digital values of the divisor n stored in the look-up table verify the following equation:

$$n = \frac{Clk * m}{fsm} * \frac{1}{(N+1)} - 1.$$

3. The method according to claim 2, wherein the values of the divisor n stored in the look-up table are within 1 and 255.

4. A pulse width modulation (PWM) system comprising:
a first circuit generating a first stream of digital data representing a first triangular shaped alternating signal of adjustable frequency and amplitude;
a nonvolatile memory containing at least a sequence of a number m of digital samples of a second alternating control signal;
at least one comparator receiving as input the first stream and a stream of digital data representing the second alternating control signal outputting a PWM signal;
means capable of establishing the scanning frequency of the digital samples from said nonvolatile memory and comprising at least one circuit that divides the frequency of a basic scanning clock signal Clk by a digital value of selection N incremented by one, said means further comprising at least one circuit that pre-divides the frequency of the basic scanning clock signal by a linearization digital value n incremented by one, and capable of producing an input signal by said digital value of selection N incremented by one.

5. The PWM system according to claim 4, wherein nonvolatile memory comprises a look-up table of pre-computed values of said linearization digital value n as a function of corresponding values of said digital value of selection N and between 1 and 255, said pre-computed values being pointed by a digital selection value of selection N and the pointed value being applied to an input of said second frequency divider circuit.

6. The PWM system according to claim 4, further comprising a pre-scaling frequency multiplier circuit having an input receiving basic scanning clock signal Clk and second inputs receiving a digital datum representative of the number m of digital samples of said sequence, and an output coupled to an input of said second frequency divider circuit.

7. The PWM system according to claim 4, wherein said nonvolatile memory contains a plurality of sequences of digital samples of an alternating signal, mutually separated in phase, and wherein the system further comprises an identical number of comparators producing an identical number of PWM control signals, mutually separated in phase.

8. The PWM system according to claim 7, wherein the alternating signal is a sinusoid.

9. The PWM system according to claim 8, wherein the PWM system is driving a tri-phase AC motor.

10. The PWM system according to claim 7, wherein the PWM system is a static DC/AC multiphase converter.

\* \* \* \* \*

UNITED STATES PATENT AND TRADEMARK OFFICE
CERTIFICATE OF CORRECTION

PATENT NO. : 5,914,984
DATED      : June 22, 1999
INVENTOR(S) : Mario Di Guardo, et al It is certified that error appears in the above-indentified patent and that said Letters Patent is hereby corrected as shown below:

On the title page, item

[73] Assignee:  Strike:  "SGS-Thomas Microelectronics S.r.l., Agrate Brianaza, Italy"

Insert:  -- SGS-Thomson Microelectronics S.r.l., Agrate Brianza, Italy --

Signed and Sealed this

Ninth Day of November, 1999

Attest:

Q. TODD DICKINSON

Attesting Officer    Acting Commissioner of Patents and Trademarks